Figure 3:
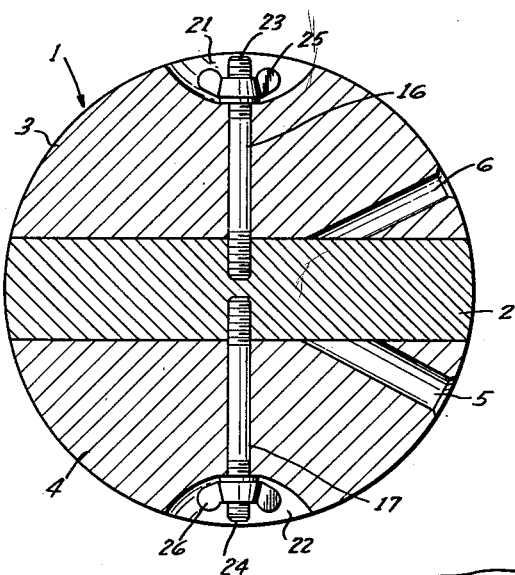

March 15, 1955 G. P. JAST ET AL 2,703,934
HAND MEASURING DEVICE
Filed Oct. 23, 1951 2 Sheets-Sheet 1
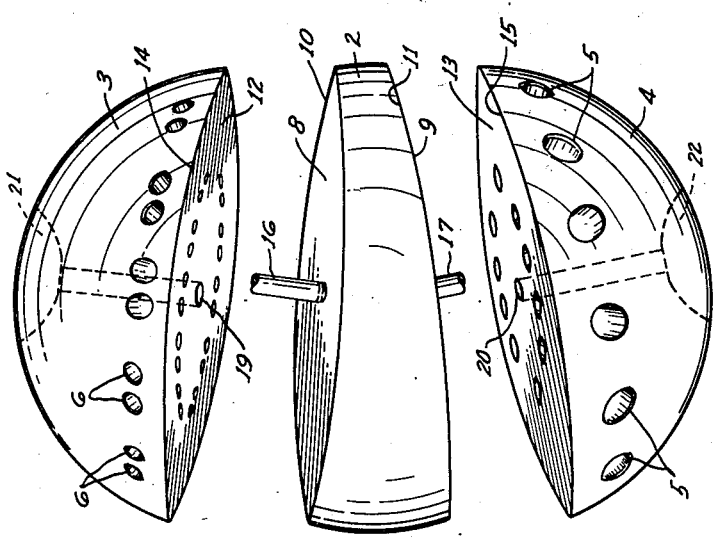
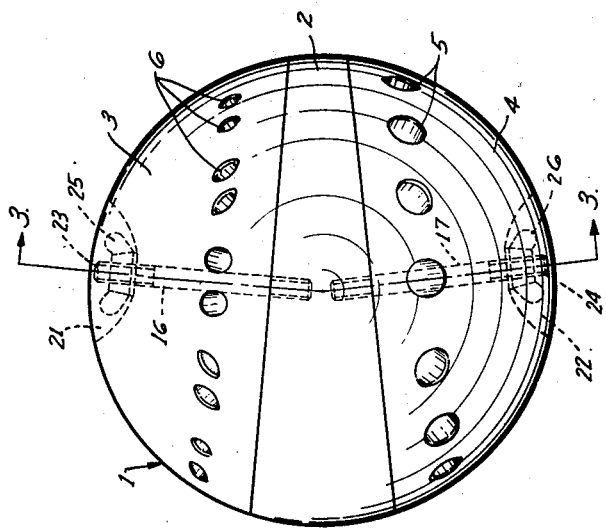
INVENTORS.
GEORGE P. JAST
JAMES M. FITZPATRICK
AND EDWARD W. GANNON
BY Bosworth & Sessions
ATTORNEYS.

March 15, 1955  G. P. JAST ET AL  2,703,934
HAND MEASURING DEVICE

Filed Oct. 23, 1951  2 Sheets-Sheet 2

INVENTORS.
GEORGE P. JAST
JAMES M. FITZPATRICK
AND EDWARD W. GANNON
BY Bosworth & Sessions
ATTORNEYS.

United States Patent Office 2,703,934
Patented Mar. 15, 1955

2,703,934

HAND MEASURING DEVICE

George P. Jast, Parma, James M. Fitzpatrick, Lakewood, and Edward W. Gannon, Cleveland, Ohio; said Fitzpatrick and said Gannon assignors to Thomas J. Unik; said Jast assignor to Thomas J. Unik, as trustee Application October 23, 1951, Serial No. 252,646

11 Claims. (Cl. 33—174)

This invention relates to measuring devices and in particular to a hand measuring device for measuring the span of a bowler's grip and the proper size and offset relation of gripping holes corresponding to the particular bowler's thumb and finger dimension for both right and left hand bowlers.

A bowler judges the comfort and adequacy of his grip on a bowling ball by the "feel" of the grip as he supports, swings, delivers and generally handles the ball under actual bowling conditions. It follows that to properly and accurately measure a bowler's hand to determine the size and ultimate location of gripping holes in a ball to be drilled, the measuring device used for this purpose should be capable of substantially duplicating the physical characteristics of a finished ball drilled with holes of the correct size and spacing so as to permit the bowler to select and test the grip most suitable for him. At the same time, the grip measuring device should have the facility of quickly and easily measuring bowlers having a wide range of grip sizes. Several measuring devices have been proposed in the past for measuring a bowler's grip but these have either failed to provide for a complete measure of the hand grip and a testing of same or they are mechanically complex and awkward and time consuming to operate.

A general object of the present invention is to provide a measuring device of the type descibed which is capable of being adjusted to substantially duplicate the actual physical characteristics of a bowling ball drilled for a particular bowler's grip so as to permit the device to be handled by the bowler being measured in the same manner as an actual bowling ball whereby the selected grip may be fully tested and therefore accurately determined. Another object of our invention is to provide a measuring device of this type which has a spherical peripheral surface simulative of the surface of an actual bowling ball, which surface is maintained smooth, continuous and uninterrupted between the finger and thumb holes regardless of adjusted variation in peripheral spacing between these holes whereby the hand of the person being measured rests on said spherical surface when his thumb and fingers are disposed in the respective holes in the device. Another object of our invention is to provide a measuring device for bowlers which has a wide range of measurement and is capable of fully and accurately measuring a large number of bowlers having different sizes of grips. A further object is to provide a measuring device with which adjustment of the grip measuring components may take place while the person being measured manipulates and handles the device as if bowling an actual bowling ball.

Another object of our invention is to provide a measuring device that is constructed with a minimum number of parts and in such a manner as to stay in adjustment practically indefinitely. Another object of our invention is to provide a measuring device which is capable of fully measuring either right or left hand bowlers for regular, modified offset or full offset grips. A still further object of our invention is to provide a measuring device for bowlers which is simple and convenient to operate, sturdy in construction and extremely economical to manufacture.

Figure 4:
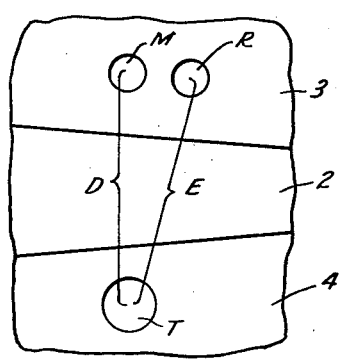
Figure 5:
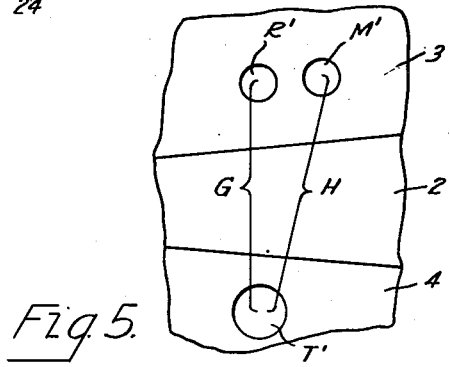
Figure 6:
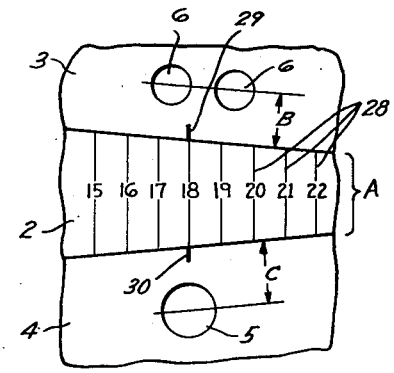
Figure 7:
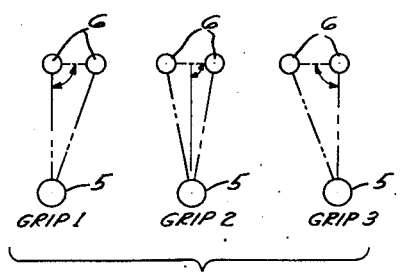

These and other objects of our invention will become apparent from the following description of a preferred embodiment thereof, reference being had to the accompanying drawings in which Figure 1 is an elevation of the measuring device embodying our invention; Figure 2 is an exploded view of the measuring device showing the position of the component parts prior to being assembled; Figure 3 is a transverse section through our measuring device showing the internal construction thereof, the section being taken on the line 3—3 of Figure 1; Figures 4 and 5 are fragmentary side elevations of the measuring device showing the spacing relationship of finger and thumb holes for right and left hand bowlers; Figure 6 is a fragmentary elevation view of the surface of a modified form of the measuring device which is calibrated and marked to provide for reading of the measurements directly from the device; and Figure 7 is a diagrammatic view illustrating different offset positions of the gripping holes.

Briefly, our invention is concerned with a spherically shaped ball, preferably a bowling ball, that is divided into three sections along a pair of chordal planes that are angularly related to each other. In other words, the center section of the sphere is a spherical wedge and is separated from the two outer spherical parts or sections along a pair of planes that form an acute angle with each other and which pass through the sphere parallel to a common diametrical axis. Thus the inner edges of the outer parts of this sphere will be spaced apart by different distances when the outer sections are joined with the wedge to form the original sphere. Each outer section is independently pivotally mounted on the wedge portion so as to be capable of rotating relative to the wedge about a radial axis normal to the plane of division between the particular outer section and the wedge. One of the outer sections is radially drilled to provide a series of thumb holes of varying sizes, the other with finger holes, and in both instances these finger and thumb holes are uniformly spaced from the inner edges of the respective outer sections. With this construction, the proper set of finger and thumb holes may be selected readily by rotating the particular outer section with respect to the center section to present holes of different sizes into which the thumbs and fingers respectively are inserted until approximately the proper fit is obtained. With the thumb and fingers disposed in the respective selected holes, the peripheral spacing or spherical distance between these holes, which is a measure of the span of th bowler's grip, may then be adjusted by rotating the wedge portion relative to the outer sections. The parts may then be locked in the position thus determined and the measuring device swung about by the person being measured so as to test the "feel" of the selected grip; the sections thereafter may be adjusted, if necessary, until the grip which is most comfortable, that is, the correct grip, is determined. The location and size of these gripping holes is the basis for forming holes in a new bowling ball which will then be properly fitted to the person so measured.

Referring now to the drawings, the measuring device 1 which embodies our invention preferably is spherically shaped and is comparable in size and weight to a standard bowling ball. This ball is made up of three sections consisting of a center section or wedge portion 2 and outer sections 3 and 4. A plurality of thumb holes 5 each having a different diameter are formed in the outer section 4 and similarly a series of finger holes 6 are formed in outer section 4 so that the measuring device may be gripped by the thumb and fingers of an individual, for example, the prospective purchaser of a new bowling ball, with his fingers reaching across or spanning the full width of the periphery of the center or intermediate section 2.

When the measuring device is assembled as shown in Figure 1, the external spherical surfaces of the outer sections are in alignment with the corresponding surface on the center section so that these three separate surfaces constitute for practical purposes one smooth continuous surface corresponding to the spherical surface of a bowling ball. To attain this result we prefer to form the three sections by cutting a solid one piece sphere or ball, such as a bowling ball into the three parts shown, the cuts or divisions being made substantially along two chordal planes which are disposed at an angle to each other and which are parallel to a common diametrical axis of the ball. Thus, the center section 2 is formed to the shape of a spherical wedge having two substantially flat surfaces 8 and 9 on opposite sides, these surfaces being spaced apart unequally as shown in the drawings so that the width of the spherical surface on the wedge portion varies uniformly from a minimum to a maximum for 180° of rotation of the section and likewise uniformly from maximum to minimum for the other 180° of revolution. These flat surfaces 8 and 9 intersect the spherical surface of the center section at edges 10 and 11 respectively. The outer sections 3 and 4 have corresponding flat surfaces 12 and 13 respectively which intersect the external surfaces of these sections at edges 14 and 15 respectively which edges define circles having diameters equal to those of the circles defined by the respective edges 10 and 11 on the center sections. Thus when the outer sections are assembled with the wedge portion so that their respective flat surfaces lie adjacent each other and with edges 10 and 14, and 11 and 15 aligned, the unit has practically the same physical characteristics as the ball from which it was cut. If the sections are cut by a saw or the like, spacers or washers, not shown, having a thickness approximately that of the saw blade may be fixed to each surface of the center section to fill the small gap created by the saw cut.

As mentioned heretofore, our measuring device is constructed in such a manner that the three sections 2, 3 and 4 which comprise it are capable of rotating relative to each other about axes normal to the planes of the respective flat surfaces of these sections. This rotational movement of the sections not only facilitates the selection of the proper size of the set of holes by which the device is gripped but also provides for variation of and accurate adjustment of the peripheral spacing between the gripping holes while maintaining a smooth and continuous spherical surface therebetween thus providing a means for measuring the span of the bowler's grip. In the preferred form of our invention, we provide for this rotational movement between the parts by securing a pair of straight rigid axle members or studs 16 and 17 to the center section as by threading same into tapped holes in the center section, these studs being connected to extend radially outwardly from the wedge portion in directions normal to the planes of the flat surfaces 8 and 9 respectively on the wedge. The outer sections 3 and 4 are radially bored out as indicated at 19 and 20 respectively, so as to snugly receive the studs, the axes of the bores in the outer sections being coincident with the axes of the studs when the sections are assembled together as shown in Figures 1 and 3. The diameter of studs 16 and 17 is slightly less than the diameter of the bores in the outer sections so that when the parts are assembled there will be a minimum of play between them and yet the outer sections will be able to pivot freely and easily on the studs.

The bores 19 and 20 terminate at their outer ends in enlarged recesses 21 and 22 in the outer sections 3 and 4. The studs 19 and 20 are preferably of such a length that they extend into these recesses but do not extend beyond them, and are threaded at these free ends 23 and 24 to receive suitable clamping elements such as wing nuts 25, 26 which when tightened on the studs lock the respective outer sections against rotation relative to the center section. The recesses 21, 22 are sufficiently deep to completely contain the wing nuts when tightened down on the studs so that no part of the nuts or studs project beyond the recess and also are sufficiently wide to permit convenient access to the wing nuts for clamping and releasing the sections. When the wing nuts are tightened down upon the studs, a corresponding pressure is transmitted by the outer sections against the flat surfaces of the wedge to prevent relative rotational movements between these parts while loosening of the wing nuts releases the pressure and permits the parts to rotate about the axes of the studs.

In order to provide for measurement of the size of the thumb and fingers of the person to be measured and to permit the measuring device to be gripped in the same way that a bowling ball is gripped, a series of thumb holes 5 are formed in one of the outer sections 4 and similarly finger holes 6 are drilled or otherwise formed in the opposite section 3. These holes 5 and 6 extend radially inwardly from the periphery as clearly shown in Figure 3 and preferably are formed on centers at the spherical surfaces of the section that are equally spaced from the respective edges 14 and 15 of the flat surfaces 12 and 13 on these sections. The diameters of the thumb holes preferably vary successively from a minimum to a maximum over a range of sizes that substantially corresponds to the range of typical thumb sizes of bowlers. For example, we have found that a series of from 10 to 12 thumb holes ranging in diameter from $1\frac{3}{16}$ inch to $1\frac{1}{8}$ inches increases between successive holes of $\frac{1}{32}$ to $\frac{1}{16}$ of an inch are satisfactory for most purposes and will accommodate the large majority of bowlers.

The finger holes 6 are shown in the drawings as being formed in pairs, this arrangement being suitable to measure individuals who use either the conventional 3-hole grip or the 2-hole grip. For the former case, one hole of each pair of finger holes is preferably substantially the same size as the companion hole to permit either right hand or left hand persons to be measured on the same instrument, and each successive set of finger holes has a slightly larger diameter than the preceding set by an amount sufficient to cover the range of sizes of the gripping fingers of the majority of bowlers. We have found that a variation of about $\frac{1}{32}$ of an inch in the diameters of successive sets of these finger holes and a provision of about seven to ten sets of holes is sufficient to adequately cover the necessary range of finger sizes. The measure of a 2-hole grip wherein the ball is gripped by the thumb and one finger is accomplished in the same way except, of course, only one of the pairs of finger holes is used at one time.

The diameter of each thumb and finger hole preferably is marked on the measuring device adjacent each respective hole so that these measurements may be easily and quickly determined by reading same directly from the instrument. The span of the gripping holes, that is, the spherical distance between the thumb hole and each finger hole of the selected set of holes found to be most comfortable for the particular individual, may be measured by means of a conventional spanning gauge having parts adjustable in length adapted to fit into the selected grip holes and measure the distance therebetween.

An alternate method or system for determining the length of span of the selected gripping holes is that of reading these distances directly from the instrument by the means illustrated in Figure 6 which preferably consists of calibrations marked on the spherical surface of the wedge portion 2 which calibrations read directly in span distance. As shown, the surface of the wedge 2 is marked with a series of equally spaced lines 28 which are arcs of great circles of the ball and which extend across the full width of the center section from side edge 10 to side edge 11. The spherical length A of each line between edges 10 and 11 is then determined. Next the distance B between the center line of the finger holes 31 and the edge 14 on section 3 and the distance C between the center line of the thumb holes and the edge 15 on section 4, are determined, both distances B and C being constant for all the finger and thumb holes respectively. The sum of B and C is then added to each length A of each line 28 on the wedge and the sum of distance A, B and C is marked directly on each line 28.

Index lines 29 and 30 are marked on the outer sections 3 and 4 adjacent the respective edges 14 and 15 thereof as shown, with index points 29 positioned midway between centers of each pair of finger holes and with index points 30 aligned with the center of each of the thumb holes 5. When the calibrated lines 28 on the wedge are aligned with index points 29 and 30 on the outer sections 3 and 4 as when the center section is rotated relative to the outer section to adjust the span of grip for a particular individual the peripheral spacing between thumb and finger holes and thus the span of the bowler's grip may be read directly from the calibrations on the wedge portion of the instrument. If the index and calibration lines do not line up, the span may be determined by reading from the nearest line 28 or if desired may be determined more accurately by interpolation.

A grip measuring ball constructed according to the principles of the present invention is capable of fully measuring the offset relationship between the thumb and finger holes, that is, the amount of lateral deviation between thumb hole and pair of finger holes of the selected set of holes which results when the outer sections 3 and 4 of the measuring device are rotated relative to each other. Figure 7 shows three different and representative positions of the gripping holes which positions differ by the amount of offset between thumb and finger holes. Grips 1 and 3 illustrate substantially the outer limits of maximum or full offset between the respective holes wherein spherical right triangles are formed by the holes. Grip 2 is an intermediate position with the thumb hole positioned substantially mid-way between the finger holes. Grip 2 represents a regular or "no-offset" grip while positions of the holes between the "full-offset" of grips 1 and 3 and the "no-offset" of grip 2 represents "modified-offset" relations. Our measuring ball is adapted to be fully adjusted to duplicate all these conditions simply by rotating the outer sections slightly with respect to each other.

The modified form of our invention wherein the wedge portion is calibrated to read directly in span distances also provides for direct measurement of the amount of offset between the thumb and finger holes. Referring to Figure 6, if the person being measured indicates that he desires a regular or "no-offset" grip, index points 29 and 30 on the outer sections are aligned with each other as shown in Figure 6 by adjustment of the relative positions of the outer sections until these index points line up with the same line 28 on the wedge portion. If the bowler indicates that he desires a "modified" or "full-offset" grip, the index point 30 is offset the desired amount from the index point 29 on the other outer section. Preferably, the lines 28 on the wedge are spaced apart by equal and known amounts so that the actual measure of the offset relation of the gripping holes may readily be determined by observing the number of lines 33 between the index points 29 and 30.

The above described grip measuring instrument preferably is used in the following manner to measure the bowling grip of an individual. The proper size of thumb hole is selected by trial and error, that is, by successively inserting the thumb into holes of different diameters until the individual judging by the "feel" of the fit is at least temporarily satisfied as to the comfort and adequacy of the fit. Next, with the wing nuts loosened so as to permit the parts to rotate about their respective axes relative to each other, the thumb still being disposed in the selected thumb hole, outer section 4 in which the thumb holes are formed is rotated relative to the wedge portion until the selected thumb hole is positioned about opposite the portion of the wedge that is minimum in width. Thus the thumb of the user is spaced a minimum distance from the series of finger holes in the other section and the next step of selecting the proper set of finger holes may be performed conveniently. The finger hole section 3 is next rotated relative to the wedge portion and the thumb hole section 4 to present different sets of finger holes which may be tried by inserting therein the middle and ring fingers until the most comfortable set of finger holes has been found.

As mentioned above, each pair of finger holes consists of holes having the same diameter although the ring finger of the user is normally not as thick as his middle finger. Thus, a set of finger holes that is selected to fit the middle finger may be slightly oversize with respect to the ring finger. Therefore, it is preferred that the proper size of hole for the ring finger be determined by independent investigation, that is, inserting the finger in several different holes until the most comfortable hole in fit is found. This may be done at the time the middle finger hole is determined upon or may be deferred until after the tests of the grip explained below have been made.

The next step consists in rotating the wedge portion relative to the two outer sections, the thumb and fingers of the user still remaining in the selected holes and thus progressively separating these selected holes and at the same time increasing the span of the bowler's grip to the desired amount. At the same time the proper amount of offset between the finger holes and the thumb hole is provided until by adjusting the relative position of the selected holes the grip "feels" proper. The wing nuts are then tightened to lock the sections in the position and to preserve the position of the gripping holes thus determined for further testing as to comfort.

Having thus set up a condition on the measuring instrument which simulates as nearly as possible the position of gripping holes most suitable for the person being measured it remains for the person to test that grip by manipulating the whole instrument in the same way as he would a bowling ball on a bowling court, that is, to test the grip under actual bowling conditions. The instrument in the bowler's grip may then be swung about, twisted and generally handled in the same way as a regular bowling ball in order to test the adequacy of the grip preliminarily determined upon. In fact, our measuring device may actually be swung and released or delivered by the person being measured to determine if the grip is satisfactory under the condition when the thumb and fingers slip out of their respective holes during actual delivery of the ball. It will be noted that the instrument is completely self-contained, that is, there are no parts projecting therefrom which might injure the user or tear his clothes while being so manipulated or otherwise inhibit or interfere with the testing of same. If as a result of these tests, the grip proves inadequate for any reason, adjustment of the same may be effected by simply loosening the wing nuts and establishing a new and more comfortable grip until final determination of the grip is made.

One of the important and highly advantageous features of our invention is the opportunity afforded by the construction of the measuring ball for effecting adjustments in the position or location of the finger and thumb holes automatically while the ball is being manipulated in the manner described above. This may be done by not tightening the wing nuts 25, 26 prior to the testing of the gripping holes and thereby permitting the outer sections and wedge portion to rotate relative to each other. Under these conditions, and as the instrument is being gripped and manipulated by the person being measured the sections 3 and 4 will readily move to relative positions most comfortable to the individual. The adjustment takes place automatically as he swings the instrument. This system has the advantage of providing for quick measurement of an individual and of determining the offset relation of the thumb and finger holes purely by "feel" of the grip. Since the rotation of the outer sections 3 and 4 will also effect a variation in the span distance, this factor of measurement may also be determined automatically along with determination of the offset relation of the gripping holes.

The data on the grip thus determined is next determined by reading the diameters of the holes directly from the instrument and by measuring the spacing between holes or the span of the grip as explained heretofore. With these data, the new bowling ball is drilled with holes that exactly duplicate the set of gripping holes previously selected and fully tested and so the user of the new ball is insured that it will fit him comfortably and that he will be able to use the ball most efficiently in play.

Another important feature of our improved instrument is that it is capable of fully measuring either right or left hand bowlers. This will be apparent from the above description of the device and by reference to Figures 4 and 5. In the case of a right hand bowler, the distance D between the thumb hole T and middle finger hole M, see Figure 4, is generally greater than the distance E between the thumb hole and ring finger hole R. Similarly, for left hand bowlers the distance G, see Figure 5, between thumb hole T' and ring finger hole R' is less than the distance H between the thumb hole and middle finger hole M. It is apparent therefore that the measuring instrument in order to be able to accommodate either type of bowler must provide for both measuring conditions. The required space relations between the holes for either type of bowler are uniquely provided for in our measuring device by reason of the angularly related flat planar surfaces 8 and 9 on the wedge portion and the formation of the finger holes on centers equally spaced from the edge 14 of the outer section 3. When the wedge is rotated to a position wherein the portion thereof having the maximum width is located to left of the selected set of gripping holes, the device is then properly oriented to measure right hand bowlers, see Figure 4. When the opposite condition is set up with the portion of maximum width of the wedge to the right of the selected holes, a left hand bowler may be measured, see Figure 5. The measuring device may therefore be quickly and easily changed to measure either the right or left hand bowler by merely rotating the wedge portion 2 with respect to the outer sections 3 and 4 through 180° until the wide parts of the wedge are located to the left or to the right respectively of the individual being measured.

From the above description of our invention it will be seen that the measuring instrument is capable of fully measuring the grip of the prospective ball purchaser by duplicating the size and spacing of gripping holes which fit him most comfortably. The unit is completely self-contained having no parts projecting therefrom and is therefore as convenient to handle as a regular bowling ball. It affords measurement of a wide variety of sizes of finger and thumb holes as well as any span size. It is operated simply by rotation of component parts. The device consists of relatively few parts which make production of the unit simple and extremely economical. Also, as a result of the simple design and the minimum number of parts used in its construction, there is virtually nothing to get out of adjustment and so the device is capable of giving trouble-free service for many years.

Changes and modifications may be made in the above described embodiment of our invention without departing from the principles and precepts of the invention. It will be understood therefore that the above description of a preferred embodiment of our invention is not to be taken as a limitation on the scope of the invention which is defined in the appended claims.

We claim:

1. A hand measuring device for bowlers comprising a ball having outer sections and a center section intermediate said outer sections, said center section having a spherical surface and two planar surfaces formed on opposite sides thereof and intersecting said spherical surface, said planar surfaces being formed at an angle to each other and facing similar surfaces on each of said outer sections whereby said outer sections are spaced apart unequally, means for supporting said sections for rotation relative to each other, thumb holes in one of said outer sections and finger holes in the other of said outer sections adapted to be gripped by a bowler whose grip is to be measured.

2. A hand measuring device for bowlers comprising a ball having outer sections and a spherical wedge between said sections, a pair of studs secured in fixed position to said wedge and extending outwardly therefrom along angularly related axes into said sections, said studs supporting said sections for rotation about the axes, respectively, of the studs whereby the spacing between fixed points on the surface of said sections respectively is varied, thumb holes in one of said sections and finger holes in the other adapted to be gripped by the bowler whose grip is to be measured.

3. A hand measuring device for bowlers comprising a ball divided into two outer sections and an intermediate wedge portion, means for mounting said sections and said wedge for rotation relative to each other, each of said sections having a flat surface adjacent and parallel to a corresponding flat surface on said wedge portion, the flat surfaces on said sections being angularly related to each other, said sections being rotatable relative to said wedge portion about separate axes extending substantially perpendicular to the planes of said flat surfaces, respectively, means for locking said sections against rotation relative to said wedge portion and each other, finger holes in one of said sections and thumb holes in the other, the spherical distance between a selected set of thumb and finger holes being variable as said side sections are rotated about said axes.

4. A hand measuring device for bowlers comprising a substantially spherical ball having two outer sections and an intermediately disposed wedge portion having a pair of angularly related flat surfaces, each of said sections having a corresponding flat surface adjacent said surfaces respectively on the wedge portion, means for supporting said sections for rotation relative to said wedge portion comprising a pair of studs secured to and projecting from said wedge portion in directions perpendicular to the planes of said surfaces, respectively, and extending into said sections, means on said studs to lock said sections and said wedge portion together and prevent relative rotational movements therebetween, one of said sections having a plurality of different sized thumb holes formed therein substantially equally spaced at the surface of said one section from the edge of the flat surface thereof, the other section having a plurality of different sized finger holes likewise substantially equally spaced from the edge of the flat surface thereof, the spherical distance between a selected set of thumb and finger holes being variable as said sections are rotated relative to said wedge portion.

5. A hand measuring device for bowlers comprising a pair of sections having spherically shaped surfaces, means for supporting said sections for rotation relative to each other about angularly related axes, one of said sections having a series of finger holes therein, the other section having a series of thumb holes, the centers of said finger and thumb holes at the point of intersection of said holes with said surfaces lying substantially in planes normal to the respective axes of rotation of said sections whereby the spherical distance between finger and thumb holes of a selected set of gripping holes is varied as said sections are rotated about their respective axes.

6. The device of claim 5 which includes a wedge portion interposed between said pair of sections, said wedge portion having a spherically shaped external surface merging evenly with said spherically shaped surfaces on said pair of sections to form therewith substantially a continuous spherical surface.

7. A measuring device of the character described comprising a spherically shaped ball divided into three parts along angularly related chordal planes, means to connect said parts together in the shape of a ball and to support said parts for rotation relative to each other about axes normal to said planes, and means associated with said parts to measure the grip of a bowler.

8. The device according to claim 7 with studs carried by one of the parts about which the other parts are adapted to rotate, and releasable clamp means on said studs for preventing rotation of the parts relative to each other.

9. The device according to claim 7 in which two of said parts have a plurality of different sized thumb holes and finger holes respectively, the spherical distance between selected sets of thumb and finger holes being variable when said two parts are rotated about said axes respectively relative to the other part.

10. A measuring device of the character described comprising a center section and two outer sections, said sections having spherically shaped outer surfaces and two pair of planar mating surfaces, said pairs of planar surfaces being angularly related to each other, said outer surfaces of said sections co-jointly forming a substantially continuous spherical surface when said sections are assembled together, means for supporting said sections for rotation relative to each other about a pair of separate axes disposed normal to said planar surfaces, respectively, one of said outer sections having a series of finger holes, the other a series of thumb holes, said finger and thumb holes at the intersection of same with the spherical surface being equally spaced respectively from the proximate mating surfaces of said sections, the spherical surface on said center section being marked to indicate the spherical distances between finger holes and thumb holes.

11. A grip and span measuring ball for bowlers comprising a circular tapered gauge member having flat side faces, a semi-spherical member having a flat face abutting each of said flat side faces of the gauge member, means for revolubly supporting said semi-spherical members on said gauge member and including means for selectively locking said semi-spherical members against rotation, one of said semi-spherical members having a circular series of thumb grip openings formed therein of varying diameters, said other semi-spherical member having a circular series of finger grip openings formed therein of varying diameters, said semi-spherical members being rotatable to position certain thumb grip openings and finger grip openings at a given width of said gauge member.

References Cited in the file of this patent

UNITED STATES PATENTS

| | | |
|---|---|---|
| 2,188,868 | Shepard | Jan. 30, 1940 |
| 2,221,938 | Barry | Nov. 19, 1940 |
| 2,393,908 | Hubbard | Jan. 29, 1946 |
| 2,453,036 | Reitsma | Nov. 2, 1948 |